United States Patent
Roederer et al.

(10) Patent No.: US 8,820,362 B2
(45) Date of Patent: Sep. 2, 2014

(54) PROTECTION OF WATER CONDUITS AGAINST FROST

(75) Inventors: Karsten Roederer, Hamburg (DE); Wilhelm Lutzer, Zarpen (DE); Claus Hoffjann, Hamburg (DE)

(73) Assignee: Airbus Operations GmbH (DE)

( * ) Notice: Subject to any disclaimer, the term of this patent is extended or adjusted under 35 U.S.C. 154(b) by 44 days.

(21) Appl. No.: 13/607,948

(22) Filed: Sep. 10, 2012

(65) Prior Publication Data

US 2013/0048128 A1 Feb. 28, 2013

Related U.S. Application Data

(63) Continuation of application No. PCT/EP2011/052266, filed on Feb. 16, 2011.

(60) Provisional application No. 61/312,391, filed on Mar. 10, 2010.

(30) Foreign Application Priority Data

Mar. 10, 2010 (DE) .......................... 10 2010 010 929

(51) Int. Cl.
*F16L 53/00* (2006.01)
*B64D 15/12* (2006.01)

(52) U.S. Cl.
USPC .............. 138/33; 138/109; 219/643; 392/480

(58) Field of Classification Search
USPC .............. 138/33, 109, 149; 219/643; 392/472, 392/468, 480
See application file for complete search history.

(56) References Cited

U.S. PATENT DOCUMENTS

| | | | |
|---|---|---|---|
| 3,378,673 A * | 4/1968 | Hopper | 392/472 |
| 4,447,707 A | 5/1984 | Baker | |
| 4,581,521 A | 4/1986 | Grise | |
| 4,874,925 A * | 10/1989 | Dickenson | 392/472 |
| 5,294,780 A | 3/1994 | Montierth et al. | |
| 5,428,706 A * | 6/1995 | Lequeux | 392/472 |
| 5,910,266 A | 6/1999 | Jones | |
| 5,933,574 A * | 8/1999 | Avansino | 392/468 |
| 6,126,483 A | 10/2000 | Kirma et al. | |
| 6,211,494 B1 | 4/2001 | Giamati et al. | |
| 7,555,349 B2 * | 6/2009 | Wessman et al. | 607/116 |
| 8,291,939 B2 * | 10/2012 | Ferrone | 138/33 |
| 2003/0190162 A1 | 10/2003 | Hersh | |
| 2008/0202616 A1 | 8/2008 | Bergere et al. | |

FOREIGN PATENT DOCUMENTS

| | | |
|---|---|---|
| DE | 19726419 A1 | 1/1999 |
| DE | 202005004602 U1 | 7/2005 |
| DE | 102009008304 A1 | 4/2010 |
| EP | 0485220 A1 | 5/1992 |
| JP | 6147390 A | 5/1994 |
| JP | 8306473 A | 11/1996 |
| WO | 2004018924 A1 | 3/2004 |

* cited by examiner

*Primary Examiner* — Patrick F Brinson
(74) *Attorney, Agent, or Firm* — Lerner, David, Littenberg, Krumholz & Mentlik, LLP

(57) ABSTRACT

A water-transporting line includes an integrated heater system for protection against frost and the appropriate connection, attachment and control elements. A self-heating water conduit segment is provided that has an integrated heating device, which device encloses the outer surface of the water conduit segment. The various segments may be connected mechanically and electrically using corresponding connecting elements.

10 Claims, 3 Drawing Sheets cross-section A-A

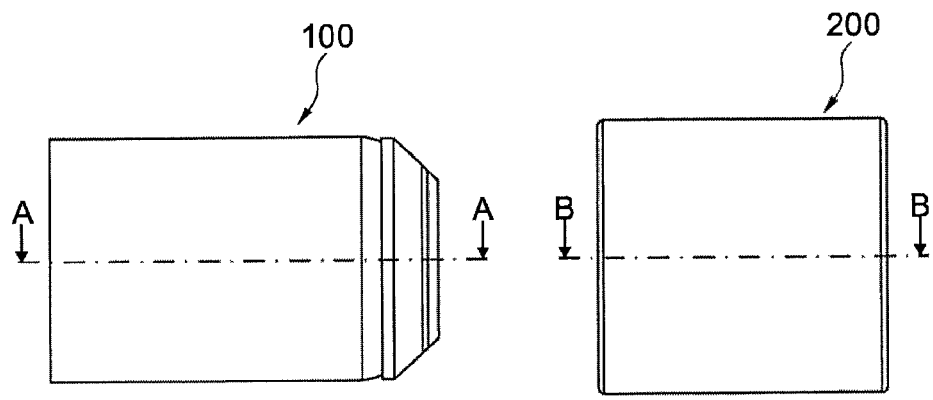
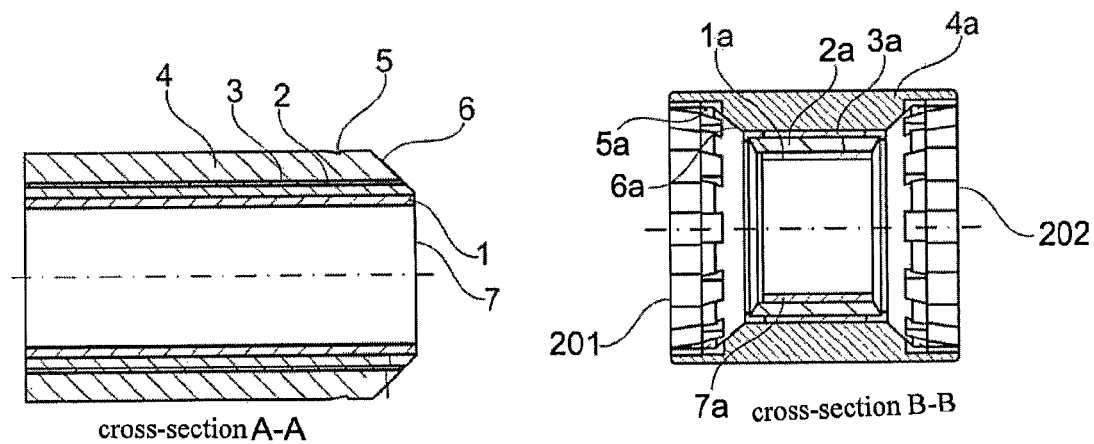
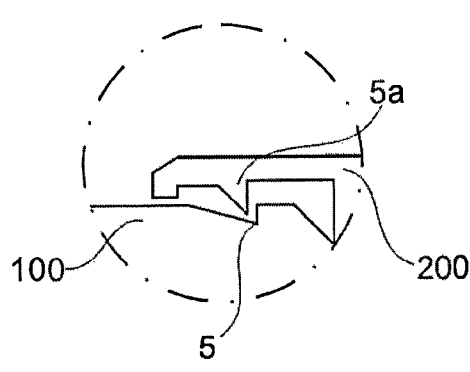
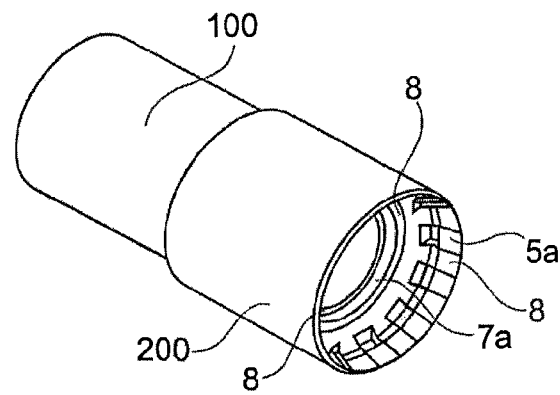
Fig. 1
Fig. 2
Fig. 4
Fig. 3

PROTECTION OF WATER CONDUITS AGAINST FROST

REFERENCE TO RELATED APPLICATIONS

The present application is a continuation of International Application No. PCT/EP2011/052266, filed Feb. 16, 2011, published in German, which claims priority from U.S. Provisional Patent Application No. 61/312,391, filed on Mar. 10, 2010, and German Patent Application No. 10 2010 010 929.0, filed on Mar. 10, 2010, the disclosures of which are incorporated herein by reference.

FIELD OF THE INVENTION

The invention relates to protection of water conduits against frost. In particular, the invention relates to a self-heating water conduit segment for an aircraft to protect against icing of the water conduit segment, a self-heating connecting element for mechanically and electrically connecting two self-heating water conduit segments, a self-heating water conduit system for an aircraft, an aircraft equipped with a self-heating water conduit system, and a method for protecting a water conduit system in an aircraft against icing.

TECHNICAL BACKGROUND

Water conduits used particularly in commercial aircraft have a tendency to freeze at high altitude and/or when the aircraft is parked in a cold climate. As a consequence, it is often necessary to heat or drain these water conduits.

As a rule, for heating items known as heater bands are used, which may comprise two conductors, a semiconductor situated between the two conductors, and an insulation layer, and which are arranged parallel to the pipelines in several sections. Installing these heater bands is often time-consuming and the operation must be performed by properly trained technical personnel.

DE 197 26 419 A1 and U.S. Pat. No. 6,126,483 describe heating conductor connection systems in an aircraft.

SUMMARY OF THE INVENTION

An aspect of the invention provides an improved system for protecting water conduits in aircraft against frost.

The exemplary embodiments described in the following relate equally to the self-heating water conduit segment, the self-heating connecting element, the self-heating water conduit system, the aircraft and the method. In other words, the features described in the following with reference to the water conduit segment for example may also be implemented in the connecting element, and vice versa.

According to a first aspect of the invention, a self-heating water conduit segment for an aircraft for protecting against icing of the water conduit segment is provided. The water conduit segment comprises an inner pipe and a heating device. The inner pipe serves to carry water, and the heating device, which surrounds an outer surface of the water conduit segment, is integrated in the water conduit segment and may be used to heat the inner pipe.

Heater bands no longer need to be installed. The various segments may be assembled so as to create a complex water conduit system.

According to another aspect of the invention, a self-heating connecting element is provided for mechanically and electrically connecting two self-heating water conduit elements, such as have been described in the preceding and will be described subsequently. The connecting element may also be configured for mechanically and/or electrically connecting more than two self-heating water conduit segments (for example T-connector or Y-connector).

According to a further aspect of the invention, a self-heating water conduit system for an aircraft is provided, that comprises a plurality of self-heating water conduit segments such as are described previously and in the following, and a plurality of connecting elements such as are described previously and in the following. In this context, each individual connecting element connects at least two water conduit segments to one another mechanically and electrically in each case.

According to a further aspect of the invention, an aircraft is provided that is equipped with a water conduit system such as is described previously and in the following.

According to a further aspect of the invention, a method for protecting a water conduit system in an aircraft against icing is provided, in which water is transported through an inner pipe of a water conduit segment and a connecting element. In addition, the inner pipe is heated by a heater device that completely surrounds the water conduit segment and the connecting element, and which is integrated in the water conduit segment and the connecting element.

It may be considered a key aspect of the invention that the pipelines carrying the water (that is to say the combination of water conduit segments and connecting elements) are heated directly, since the heating device is integrated in the pipeline. In this way, for example, the transfer of heat may be improved. In addition, the heat output may be delivered continuously throughout the entire pipe system and the heat output actually present at any given location may be directly monitored. In this way it is possible to avoid generating a higher heat output than is necessary, so that the energy consumption and thus also the fuel requirement of the aircraft may be reduced.

Since the pipelines carrying the water are heated directly, installation may be simplified. This too may result in improved heat transfer and further weight savings, since no additional elements have to be installed. Moreover, the transfer of heat between the heater device and for example the inner pipe may be optimized because the heater device is integrated in the pipelines. If designed suitably, it thus also becomes possible to provide both hot water and cold water circuits, thereby rendering instantaneous water heaters and boilers unnecessary.

According to one embodiment of the invention, the heater device is a semiconductor heating device (for example a positive temperature coefficient (PCT) thermistor), which comprises an inner conductor, an outer conductor and a semiconductor arranged between these two, the inner conductor, the semiconductor and the outer conductor being arranged coaxially with respect to each other.

According to a further embodiment of the invention, the inner conductor constitutes the inner pipe itself, which serves to carry the water. The outer pipe or metallic mesh serves as the AC conductor.

Optionally, the inner pipe may comprise an inner, insulating sheathing.

According to a further embodiment of the invention, the water conduit segment comprises an outer insulating sheathing made from plastic, which is arranged around the outer conductor.

At this point, it should again be noted that the features described in the following and in the preceding text of course may also be implemented in the connecting element. Thus for example the connecting element may also comprise a plastic insulation sheathing, which connects with the corresponding insulation sheathing element of the water conduit segment when the system is installed.

According to a further embodiment of the invention, the water conduit segment may be of flexible construction for installation. In particular, the conductive layer may also be made from a mesh, and in this case separate power supply lines may be provided.

In addition, according to a further embodiment of the invention the insulating sheathing may be designed such that it cures after the water conduit segment has been installed.

According to a further embodiment of the invention, the self-heating connecting element comprises a first conical region or area on a first frontal face of the connecting element, this first conical region or area being designed so as to provide an electrical and a mechanical connection with a first water conduit segment when the connecting element and the water conduit segment are connected with one another.

According to a further embodiment of the invention, the connecting element comprises a second conical region or area on a second frontal face of the connecting element, the two conical regions or areas being designed so as to assure the electrical and mechanical connection between the two water conduit segments. The frontal faces of the water conduit segments are furnished with corresponding conical regions or areas, which are designed to create a connection with the conical regions or areas of the connecting elements.

According to a further embodiment of the invention, the connecting element also comprises a heating device with an inner conductor, an outer conductor, and a semiconductor arranged between these two, the inner conductor, the semiconductor and the outer conductor being arranged coaxially with respect to each other.

When the water conduit system is installed, the corresponding inner conductors, semiconductors and outer conductors of the connecting elements and the water conduit segments are connected to each other.

According to a further embodiment of the invention, the connecting element has a first electrical connector that leads to the inner conductor. A second electrical connector is also provided, on the outer conductor, and the two connectors are designed such that they may be connected to a control device, so that electrical power may be fed to both the inner conductor and the outer conductor via the control device.

According to an embodiment of the invention, the self-heating water conduit system comprises a plurality of water conduit segments and connecting elements such as are described in the preceding and in the following text, wherein the heater devices completely surround the water conduit segments and the connecting elements in the manner of a sheath. In particular, for example, there are no discontinuities between the water conduit segments and the connecting elements in the connection areas.

In the following, embodiments of the invention will be described with reference to the figures.

BRIEF DESCRIPTION OF THE FIGURES

FIG. 1 shows two views of a self-heating water conduit segment according to an embodiment of the invention.

FIG. 2 shows two views of a self-heating connecting element according to an embodiment of the invention.

FIG. 3 shows a perspective view of the connection between a water conduit segment and a connecting element according to an embodiment of the invention.

FIG. 4 shows the design of a clip connection between a water conduit segment and a connecting element according to an embodiment of the invention.

DETAILED DESCRIPTION OF EXEMPLARY EMBODIMENTS

Figure 5:
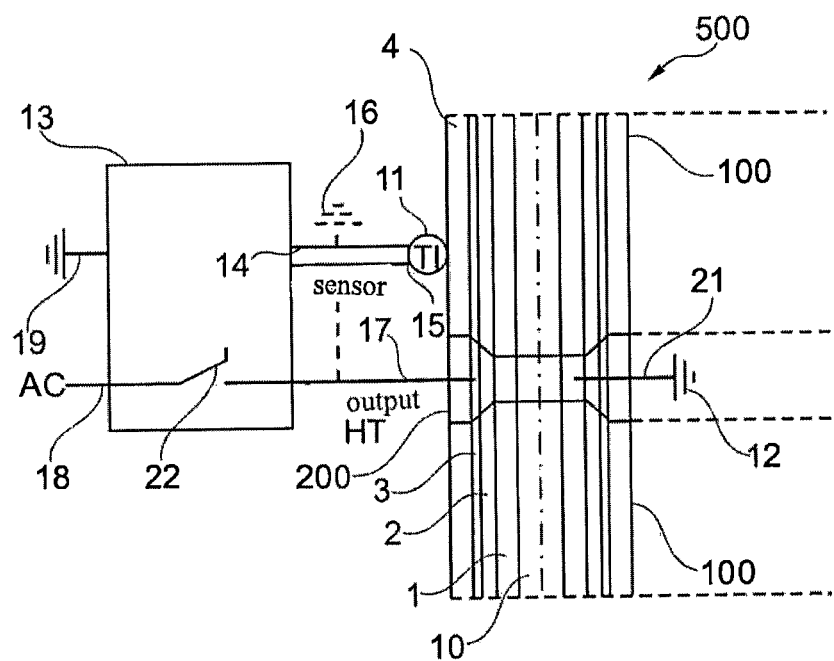
FIG. 5 shows a self-heating water conduit system according to an embodiment of the invention.

The representations of the figures are diagrammatic and are not drawn to scale.

In the following description of the figures, the same reference numbers are used to designate identical or similar elements.

FIG. 1 shows a side view of a self-heating water conduit segment 100 and a view of a cross-section thereof along plane A-A.

FIG. 2 likewise shows a side view of a self-heating connecting element 200 and a view of a cross-section thereof along plane B-B.

The pipelines (water conduit segment 100 and connecting element 200) are constructed coaxially. They include (from the inside outwards) a metal inner conductor 1, 1$a$, which may also serve as a water transporting line, a semiconductor layer 2, 2$a$, a metal outer conductor 3, 3$a$ and an insulating layer 4, 4$a$, made for example from a plastic material.

Water conducting element 100 is also furnished with an annular recess 5 (called a clip groove) in insulating layer 4, in which a corresponding clip tab 5$a$ of the connecting element may be engaged to join connecting element 200 to water conduit segment 100 and secure it thereto.

The various layers 1, 1$a$, 2, 2$a$, 3, 3$a$, 4, 4$a$ are selected and arranged, and their various thicknesses coordinated with each other in such manner that the pipe is able to be bent. Plastic insulating sheath 4 may be made for example from a UV-sensitive material that hardens when exposed to UV light. In the supplied condition, this layer is protected by a film that is impermeable to light. After the pipe has been bent into its desired shape, the protective film is removed and the pipe is cured using a UV lamp so that it becomes dimensionally stable.

The materials that are eligible for use in water-transporting inner conductor 1 may be determined on the basis of the pertinent regulations governing drinking water as stipulated in the following rules and ordinances: German drinking water ordinance—TrinkwV 2000; French drinking water ordinance—Qualité des eaux destinée à la consommation humaine; US drinking water ordinance Part 141—National Primary Drinking Water Regulations; EU Council Directive 98/83/EC of 3 Nov. 1998 on the quality of water intended for human consumption; ESA Guideline—PSS-03-402 Issue 1—Water Quality Standards in Manned Space Vehicles.

Specially designed coupling sleeves (in other words connecting elements 200) having an interior cone are used for providing electrical contact between the segments. Alternatively, the coupling sleeves may have an outer cone, in which case the corresponding frontal face of water conduit segment 100 has an interior cone. O-rings 7$a$ are located inside these coupling sleeves to seal the system and prevent water from escaping. Coupling sleeves 200 retain pipes 100 by means of a spatially locking circlip, cutting ring or clamping ring connection.

Reference numbers 6 and 6a show the abutment cone of tubular water conduit segment 100 and the corresponding abutment cone of coupling sleeve 200.

Reference number 7 indicates the frontal face of water conduit segment 100, and therewith also inner conductor 1, where the contact surface for O-ring 7a is located in coupling sleeve 200.

The sleeve-like connecting segment 200 may be connected by both the left frontal face 201 and the right frontal face 202 thereof to a corresponding water conduit segment 100.

Water conduit segments 100 may be cut to any desired length. For the sleeve connection, the ends of the water conduit segments are chamfered to form a cone shape in an appropriate device. This chamfering is carried out for example by milling or turning.

The electrical contact between individual layers 1, 1a; 2, 2a and 3, 3a is assured via a toothed arrangement inside coupling cone 200, which is forced into the chamfered surfaces of the inner conductor and the outer conductor of the pipes when the two components are joined together.

At this point, it should be noted that the individual water conduit segments may have continuous layers 1, 2, 3, 4. It is also possible for heater element layers 1, 2, 3 to be constructed in separate segments, which are insulated from each other, may be furnished with their own electrical connectors, and be of different thicknesses. In this way, it is possible to heat different pipe segments at different rates, depending on the temperature profile. This individual heating of different pipe segments may be assured via a corresponding control unit 13 in conjunction with temperature sensors 11 (see FIG. 5).

FIG. 3 shows a perspective view of a connection between a coupling sleeve 200 and a water conduit segment 100. This shows particularly that the coupling sleeve (that is to say connecting element 200) has a somewhat larger diameter than the water conduit segment (pipe) 100. A plurality of clip tabs 5a are conformed on the inner surface of conical recess 6a of connecting element 200, and these engage in corresponding clip groove 5 in water conduit segment 100 when the two elements are pressed together.

Multiple contact surfaces (created by chamfering) 8 are also provided, and these contact the corresponding layer 1, 2, 3 of water conduit segment 100 when the water conduit segment and the connecting element are joined. These contact surfaces are connected to electrical passthroughs, which pass to the outside through the body of connecting element 200, so that a regulating and control unit 13 may be connected. If for example the structure and/or number of layers becomes complex, the sensor supply line may be routed separately.

In addition, recesses may be provided for a disengagement tool, which may be used to separate the water conduit segment from the connecting element.

FIG. 4 shows an enlarged view of a cross section through the clip connection. Water conduit segment 100 has a clip groove 5 in which a corresponding clip tab 5a on connecting element 200 engages when connecting element 200 has been pushed over the frontal face of water conduit segment 100.

FIG. 5 shows a water conduit segment 500 comprising a plurality of self-heating water conduit segments 100, and which are connected to each other via corresponding coupling sleeves or connecting elements 200.

Connecting element 200 is furnished with an interlayer connection 21 that connects inner conductor 1 to an earth connection 12. A further interlayer connection 17 is also provided and connects outer conductor 3 with control and regulating unit 13. This also makes it possible to dispense with an internal coating. A leak would then also always cause the current to flow from the inside towards the outside within the leak. The control and regulating unit (for example IPCU-ESW) is equipped with a switch 22 that is able to establish a connection between the inner conductor and an AC current source via line 18.

Multiple temperature sensors 11 may also be provided to measure the temperature in the water-bearing line 10 and/or the temperature in one of layers 1, 2, 3, 4. For this purpose, one of the temperature sensors is connected to control and regulating device 13 via lines 14, 15. An earth connection 16 may also be provided, and this may be connected to line 14 or 15.

Control and regulating unit 13 may also be connected to earth via line 19.

This makes it possible to provide a pipeline that is heated throughout.

Figure 6:
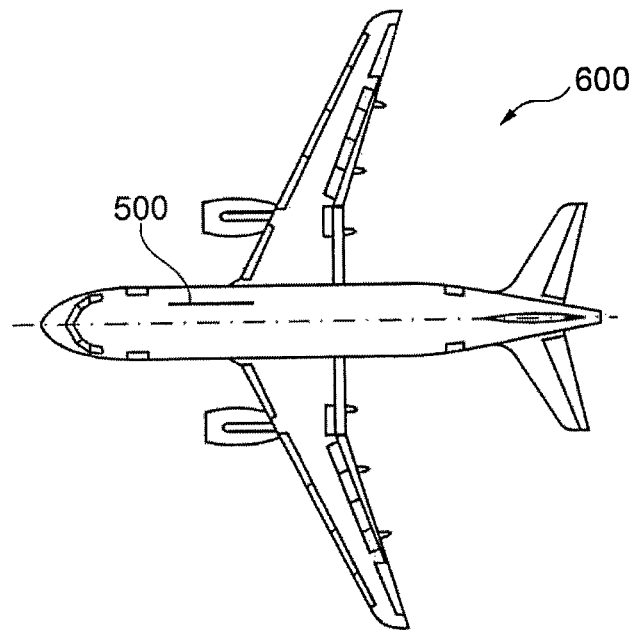
FIG. 6 shows an aircraft according to an embodiment of the invention.

FIG. 6 shows an aircraft 600 in which a self-heating water conduit system 500 has been installed. Self-heating water conduit system 500 may be located in the fuselage and/or the wings and/or the tailplane of aircraft 600.

Figure 7:
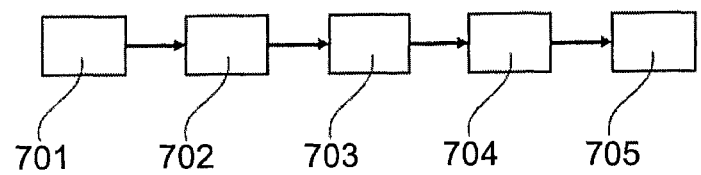
FIG. 7 shows a flowchart for a method according to an embodiment of the invention.

FIG. 7 shows a flowchart for a method according to an embodiment of the invention. A heater element is provided that has an inner conductor, a semiconductor material and an outer conductor, which surround the pipe coaxially. Inner conductor may also be the water-transporting element. If the water conduit system is constructed so as to be flexible, it may be shaped and correspondingly fitted into the aircraft before being put into operation. After shaping, it may be rendered rigid, for example by UV curing, thermal curing, or via inductive curing of the previously insulating mantle.

In the case of a flexible construction, the snap-on connection may be hardened before bending, or it may be made from a different material that is less flexible.

The pipe reaches its maximum compressive strength after the plastic insulation sheath has been hardened. The act of connecting the water conduit segments with the connecting elements also creates a mechanical and electrical contact for the pipe and the individual layers of the water conduit segments. Certain connecting elements of the water conduit system may be furnished with contact for connection to the electrical system of the water conduit system.

Under certain conditions, not all connecting elements may be furnished with two conically shaped frontal faces. For example, it is possible that a connecting element may have only one conically shaped frontal face, and it may be equipped with a different connecting system on the other frontal face, for example a threaded connection may be utilized to connect the connecting element with the corresponding water conduit segment.

In addition, the connecting elements may be in the form of a T-member, a crosspiece or a Y-member to enable branches in the water circulation system.

In particular, the outer surface of the pipeline may be smooth or corrugated. The segments may be connected to the connecting elements by means of a positive locking clip, cutting ring or clamping connector, and this connection may be resistant to a pressure in the range of the required nominal pressure. In particular, this connection may be designed so as to be detachable. In particular, the connection may also be secured against inadvertent disconnection.

The heat output of the water conduit system may be regulated or controlled via a corresponding regulating or control unit 13 (see FIG. 5). Temperature sensors 11 may be provided that continuously measure the water temperature and/or the temperature of one of the layers. The temperature regulator may function automatically to protect against frost or it may adjust the water temperature to a given, specified value by means of temperature preselection. The heating medium itself may be used as the temperature sensor, if for example the resistance (or other physical properties) thereof have a corresponding temperature dependency.

In step 701, water is initially fed through an inner pipe of a water conduit segment and a connecting element. Then in step 702 the water temperatures in certain water conduit segments and/or connecting elements of the water conduit system are measured. The measured values are then forwarded to a control unit/regulating unit 13 in step 703. This unit 13 analyzes the various measured temperatures and ensures that each segment is heated correspondingly, so that a desired setpoint temperature is reached. This takes place in step 705.

Otherwise, it should be noted that the terms "comprising" and "including" do not exclude other elements or steps, and "an" or "a" does not preclude the existence of multiple elements in question. It should further be noted that features or steps that have been described with reference to one of the preceding embodiments may also be used in combination with other features or steps of other embodiments described in the preceding. Reference numbers in the claims are not to be interpreted as limitations thereto.

REFERENCE NUMBERS

1 Inner conductor pipe
1a Inner conductor coupling sleeve
2 Semiconductor pipe
2a Semiconductor coupling sleeve
3 Outer conductor pipe
3a Outer conductor coupling sleeve
4 Pipe insulation
4a Coupling sleeve insulation
5 Pipe clip groove
5a Coupling sleeve clip tab
6 Pipe abutment cone
6a Coupling sleeve abutment cone
7 O-ring bearing surface
7a O-ring
8 Contact tip
100 Water conduit segment
200 Connecting element
10 Water-transporting line
11 Temperature sensor
12 Earth
13 Regulating or control unit
14 Temperature sensor, first line
15 Temperature sensor, second line
16 Earth
17 Inner conductor connector
18 AC connector for the regulating or control unit
19 Earth
20 Outer conductor connector
21 Interlayer contact
22 Switch

The invention claimed is:
1. A self-heating water conduit segment for an aircraft to protect against icing of the water conduit segment, the water conduit segment comprising:
an inner pipe for transporting water; and
a heater device surrounding an outer surface of the water conduit segment;
wherein the heater device is integrated in the water conduit segment;
wherein the heater device comprises a semiconductor heater device comprising an inner conductor, an outer conductor, and a semiconductor arranged between the inner and outer conductors;
wherein the inner conductor, the semiconductor and the outer conductor are arranged coaxially with respect to each other; and
wherein the inner conductor is the inner pipe.
2. The self-heating water conduit segment of claim 1, further comprising:
an insulation sheath made from plastic and arranged around the outer conductor.
3. The self-heating water conduit segment of claim 1, wherein the water conduit segment is configured to be flexible for installation.
4. A self-heating water conduit segment for an aircraft to protect against icing of the water conduit segment, the water conduit segment comprising:
an inner pipe for transporting water;
a heater device surrounding an outer surface of the water conduit segment; and
an insulation sheath made from plastic and arranged around an outer conductor;
wherein the heater device is integrated in the water conduit segment, and
wherein the insulation sheath is configured to be hardened after the water conduit segment has been installed.
5. A self-heating connecting element for mechanically and electrically connecting first and second self-heating water conduit segments, wherein the first and second self-heating water conduit segments comprise:
an inner pipe for transporting water;
a heater device surrounding an outer surface of the water conduit segment; and
a first conical region on a first frontal face of the connecting element;
wherein the heater device is integrated in the water conduit segment; and
wherein the first conical region is configured to provide an electrical and mechanical connection with the first water conduit segment.
6. The self-heating connecting element of claim 5, further comprising:
a second conical region on a second frontal face of the connecting element,
wherein the first and second conical regions are configured to provide the electrical and mechanical connection between the first and second water conduit segments.
7. The self-heating connecting element of claim 5, further comprising:
a heater device having an inner conductor, an outer conductor and a semiconductor arranged between the inner conductor and the outer conductor;
wherein the inner conductor, the semiconductor and the outer conductor are arranged coaxially with respect to each other.
8. The self-heating connecting element of claim 5, further comprising:
a first electrical connector for an inner conductor;
a second electrical connector for an outer conductor;
wherein the first and second connectors are configured to create a connection to a control device.
9. A self-heating water conduit system for an aircraft, the water conduit system—comprising:
a plurality of self-heating water conduit segments;
a plurality of connecting elements;

wherein each of the connecting elements is configured to provide a mechanical and electrical connection between each of at least first and second water conduit segments;

wherein each of the plurality of water conduit segment comprises:

an inner pipe for transporting water;

a heater device surrounding an outer surface of the water conduit segment; and an insulation sheath made from plastic and arranged around an outer conductor;

wherein the heater device is integrated in the water conduit segment; and wherein the insulation sheath is configured to be hardened after the water conduit segment has been installed.

10. The self-heating water conduit system of claim 9, further comprising a plurality of the heater devices completely surrounding the water conduit segments and the connecting elements.

* * * * *